United States Patent [19]

Fulger et al.

[11] 4,138,500
[45] Feb. 6, 1979

[54] ACID SOLUBLE ACYLATED PROTEIN AND METHOD

[75] Inventors: Charles V. Fulger; James E. Dewey, both of Battle Creek, Mich.

[73] Assignee: Kellogg Company, Battle Creek, Mich.

[21] Appl. No.: 792,973

[22] Filed: May 2, 1977

[51] Int. Cl.$^2$ .............................................. A23L 1/20
[52] U.S. Cl. ........................................ 426/46; 426/44; 426/52; 426/477; 426/598; 426/656
[58] Field of Search ....................... 426/18, 46, 44, 52, 426/477, 656, 630, 634, 598; 260/112 R

[56] References Cited

U.S. PATENT DOCUMENTS

| | | | |
|---|---|---|---|
| 2,729,628 | 1/1956 | Mann | 260/112 R |
| 3,764,711 | 10/1973 | Melnychyn | 426/656 |
| 3,846,560 | 11/1974 | Hempenius | 426/18 |

Primary Examiner—R. B. Penland
Attorney, Agent, or Firm—Gary, Juettner & Pyle

[57] ABSTRACT

Oleaginous protein is first converted to acid soluble polypeptides by hydrolysis with a proteolytic enzyme. The hydrolyzate is then acylated to produce an acid soluble protein concentrate having a bland flavor and substantially no objectionable odor.

8 Claims, No Drawings

ACID SOLUBLE ACYLATED PROTEIN AND METHOD

BACKGROUND OF THE INVENTION

Protein fortification of acidic foods having a pH in the range of 2 to 6 is complicated by the unavailability of protein exhibiting satisfactory nutritional and taste characteristics. Oleaginous proteins, especially soy protein, when altered to be acid soluble, are characterized as having undesirable taste characteristics variously described as beany and bitter. The objectionable flavor is especially noticeable in acidic beverages that contain an insufficient number of other ingredients to mask the strong flavor at the protein levels of 2% to 8% or higher.

Hydrolysis of seed protein by the action of proteolytic enzymes is already a well known procedure, resulting in a water soluble product that may remain soluble or partially soluble under acidic conditions. Known processes for enzyme digestion are described in U.S. Pat. No. 3,814,816, U.S. Pat. No. 3,830,942, U.S. Pat. No. 3,843,802 and U.S. Pat. No. 3,846,560.

According to the conventional procedure, protein is isolated from the seed in a water slurry. The proteolytic enzyme is added, and the pH of the slurry is adjusted to optimize the reaction conditions relative to the specific enzyme employed. The slurry may be heated prior to the addition of the enzyme as well as during enzyme digestion.

The polypeptide mixture produced from enzyme hydrolysis is water soluble at acid or neutral pH, but has a stronger flavor than the original isolated protein. Consequently, it would be desirable to decrease the strong or bitter flavors and yet retain acid solubility.

SUMMARY OF THE INVENTION

The present invention provides improvements in taste characteristics of oleaginous hydrolyzates obtained by enzyme hydrolysis of the protein therein. The hydrolyzate is chemically modified by reaction with an acylating agent, preferably a dicarboxylic acid anhydride such as succinic anhydride. By this procedure, the free amino groups of the polypeptides are acylated, resulting in substantial taste improvement, particularly in acidic solution.

The acylation of protein per se is a well known procedure. For example, in U.S. Pat. No. 3,764,711, the patentee prepares a coffee whitener by acylating unhydrolyzed soy protein. The same patentee, however, demonstrates that the acylation of protein that has been previously hydrolyzed results in a product that has undesirable taste characteristics. Also, the acylated hydrolyzed protein is described as being insoluble in acid solutions.

Unexpectedly, it has been discovered that the acylation of the enzyme hydrolyzate results in substantial improvements in taste characteristics while the product remains soluble in acid solution.

DESCRIPTION OF THE PREFERRED EMBODIMENTS

The present invention is applicable to enzyme hydrolyzed, acid soluble protein from soy beans. It would reasonably be expected to apply equally well to similarly isolated protein from peanut, cottonseed, corn, rape, and sesame. The process of the present invention has been found inapplicable to animal protein.

The seeds, such as soybean, are first treated to isolate the protein. For example, soybean meal may be extracted with a mild alkali having a pH of about 7.5 to about 9.5. The aqueous extract is separated from the solid fraction and the pH is then adjusted to about 4.5 to precipitate the proteins. The precipitated proteins may be washed and are then ready for enzyme hydrolysis.

An aqueous slurry of the soy protein may be heated to a temperature between about 200° F. to about 265° F. for a period of time without deleteriously affecting the flavor optimization of the final product. A heating period from 1 to about 25 seconds is generally sufficient, depending on the temperature.

The partially denatured protein is then treated with a proteolytic enzyme, preferably under slightly acid or basic conditions. Suitable enzymes include endopeptidases, such as neutral and alkaline plant or animal protease enzymes, pepsin, ficin, papain, renin, trypsin and chymotrypsin, as well as microbial exopeptidases, such as aminopeptidase and carboxypeptidase A and B.

The pH and concentration of the slurry may be adjusted to assure maximum activity of the enzyme selected, in accordance with well known principles, and preferably concentration of the protein should not exceed 20 percent. The amount of enzyme used and the time for digestion will vary with the type of enzyme used, the temperature, and the pH, such variables being determinable by those skilled in the art. Generally, the temperature is raised to a level above room temperature but is held below a value, generally about 160° F., that would inactivate or denature the enzyme.

The enzyme hydrolysis is continued until a major portion of the protein has been hydrolyzed, preferably between 60% and 85%, and is then terminated. The resulting polypeptide mixture will be soluble in a solution having a wide range of pH values, but for the purpose of the present invention, the mixture will be soluble in a solution having a pH between 2 and 6. After removal of any insoluble fraction, the solution may be dried.

The protein isolate is then placed in solution and acylated by conventional methods. The acylating agent is a compound capable of acylating the functional groups of the protein hydrolyzate, such as oxygen, sulfur or nitrogen, which have replaceable hydrogen atoms to provide sites for reaction with this agent. Suitable agents include carboxylic acid anhydrides, either internal or external, such as mono carboxylic acid anhydrides, including acetic anhydride and propionic anhydride, as well as dicarboxylic acid anhydrides, such as succinic anhydride, glutamic anhydride and maleic anhydride, as well as mixtures of the foregoing. Succinic anhydride is preferred and is added as a solid to the hydrolyzate solution maintained at a neutral pH of about 7.0 to about 7.2. The solution is preferably cooled to a temperature of from about 1° to about 15° C. during the reaction.

In particular, the reaction solution contains from about 3% to about 15% of the protein hydrolyzate, and sufficient acylating agent is added to substantially completely react with the available functional groups, usually about 7% to about 18%, based on the weight of the hydrolyzate. The addition of a 0.08m solution of sodium chloride may be required for solutions containing polypeptides that would not be otherwise soluble at neutral pH and require an increased ionic strength in the solution for solubility. The acylating agent is added to the solution thus prepared, and the pH is adjusted to neutral or slightly above by addition of a suitable base, such as potassium hydroxide, sodium hydroxide or others. Preferably the pH is maintained between 7.0 and 7.2 by continuous titration until the acylating agent is completely dissolved and the reaction is completed. Inorganic salts produced by the reaction may be removed by dialysis, electrophoresis, reverse osmosis or other suitable desalting techniques. The solution may then be dried to obtain the carboxyacylated hydrolyzate in solid form.

The product thus obtained has a very mild or bland odor and flavor and does not develop objectional flavors when dissolved in acid solutions having a pH of from about 2.0 to 6.0. The product is thus particularly suitable for incorporation into acidic beverages including natural or artificial acidic fruit drinks. Suitable beverages would include, for example, citrus and tomato beverages. The product is also suitable for incorporation into carbonated beverages.

EXAMPLE I

In the preparation of bland acid soluble protein, 134 g. of enzyme hydrolyzed soy protein (Type 1205, Gunther, Division of Staley) was dissolved in 1 liter of distilled water in an ice bath; The pH of the solution was 4.46, and the temperature was 37° F. To the solution was added 12.5 ml NaOH (5N) in order to bring the pH to 7.05. Succinic anhydride (11.7 g.) was sprinkled slowly into the reaction mixture while maintaining the pH between 7.0 and 7.2 by continuous titration with NaOH (5N). About 48 ml. of the sodium hydroxide was used in this titration.

When the pH remained constant, indicating completion of the reaction, the reaction mixture was dialyzed versus 5 one-gallon volumes of distilled water using a hollow fiber dialyzer and changing the water every 20 minutes. The reaction mixture was then freeze dried.

EXAMPLE II

Three different types of enzyme hydrolyzed soy protein, Gunther Type 1205, Gunther Type 1043 and Central Soya Type FS704 were subjected to succinylation in accordance with Example I. An orange drink was prepared and divided into three portions. The same amount of succinylated protein was added to equal volumes of orange drink and subjected to taste tests. Identical samples containing the same amount of protein without succinylating were prepared for the sake of comparison. In all cases, a taste improvement was observed with the succinylated protein, including a reduction in soy flavor and bitterness.

EXAMPLE III

A 3.7 percent protein fortified, natural orange juice beverage was prepared by addition of 4.66 g. of succinylated, acid soluble soy protein (80% protein by assay) to 100 ml. of reconstituted frozen orange juice concentrate.

EXAMPLE IV

A protein fortified, natural orange juice concentrate was prepared by addition of 33.12 g. of succinylated, acid soluble soy protein to 6 ounces of orange juice concentrate. When reconstituted with 18 ounces of water, this concentrate gives 3.7% protein fortified, natural orange juice.

EXAMPLE V

A 4.0 percent protein fortified artificial orange juice beverage was prepared by dissolving the following formulation in 100 ml cold water:

| | |
|---|---|
| Sucrose | 11.5 g. |
| Citric Acid, anhydrous | 1.0 g. |
| Cellulose Gum | 0.1 g. |
| Orange Flavor | to suit |
| Orange Color | to suit |
| Succinylated, acid soluble soy protein | 5.0 g. |

EXAMPLE VI

A 3.8 percent protein fortified, 50 percent natural, 50 percent artificial orange juice beverage was prepared by mixing equal volumes of the beverages described in Examples III and V.

EXAMPLE VII

A carbonated, 4.0 percent protein fortified, natural orange juice beverage was prepared by addition of 10.0 g of succinylated, acid soluble soy protein to 200 ml. of reconstituted frozen, orange juice concentrate followed by carbonating the beverage with a pressurized carbon dioxide cylinder.

EXAMPLE VIII

A 4.0 percent protein fortified, artificial tomato juice beverage was prepared by dispersing the following formulation in 8 ounces of cold water:

| | |
|---|---|
| Tomato Powder | 30.0 g. |
| Sodium Chloride | 1.2 g. |
| Citric Acid, anhydrous | 1.0 g. |
| Tomato Flavor | to suit |
| Succinylated, acid soluble soy protein | 12.0 g |

The beverages described in Examples II through VIII are typical of acidic beverages that may contain the modified protein of the present invention. All of these beverages are highly palatable and are free from excessive bitterness and objectionable soy flavor.

What is claimed is:

1. Method for producing a modified proteinaceous food having mild flavor comprising the steps of first hydrolyzing protein obtained from oleaginous seeds with a proteolytic enzyme to form an acid soluble polypeptide mixture, and then acylating said mixture to form an acylated hydrolyzate.

2. The method according to claim 1 wherein the protein is soy protein.

3. The method according to claim 1 wherein said acylated hydrolyzate is soluble in acid solutions having a pH of from about 2 to about 6.

4. The product obtained from the process of claim 1.

5. An acidic beverage containing the product of claim 1.

6. The beverage of claim 5 wherein said beverage is carbonated.

7. Method for producing a modified proteinaceous food having mild flavor comprising the steps of first hydrolyzing protein obtained from oleaginous seeds with a proteolytic enzyme to form an acid soluble polypeptide mixture, said protein being selected from the group consisting of protein derived from soy, peanut, cotton seed, corn, rape, sesame and mixtures thereof, and then acylating said mixture to form an acylated hydrolyzate.

8. The method of claim 7 wherein said mixture is acylated with succinic anhydride.

* * * * *